Nov. 17, 1970    W. HENNING    3,540,092
HOSE CLAMP WITH TIGHTENING WORM
Filed July 22, 1968    2 Sheets-Sheet 1
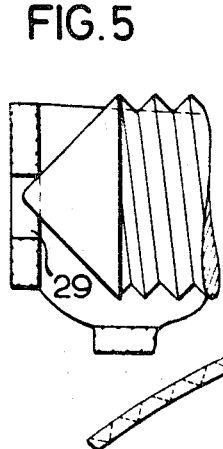
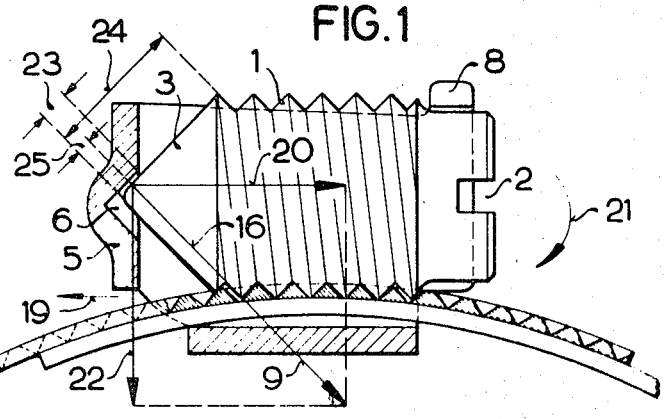
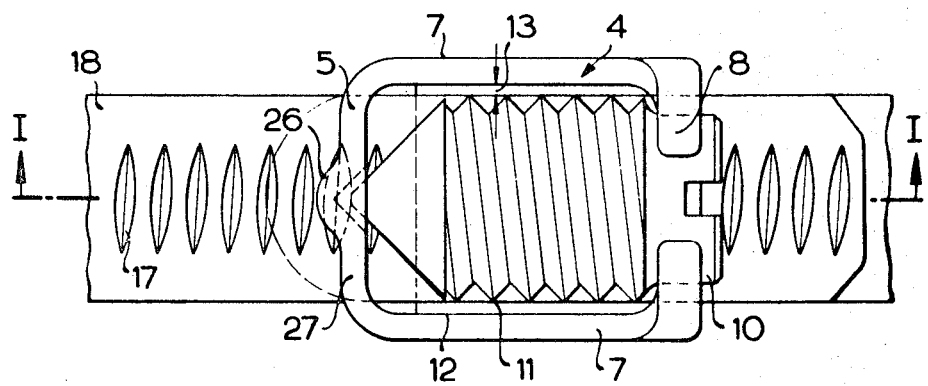
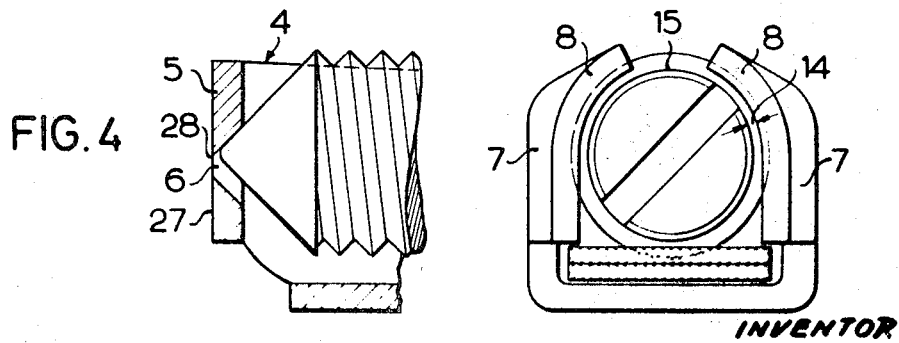
INVENTOR
WOLFGANG HENNING,
Karl F. Ross
Attorney

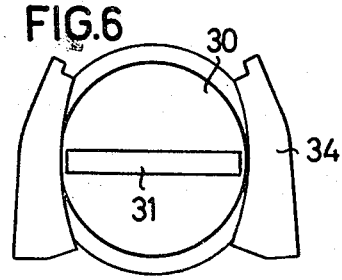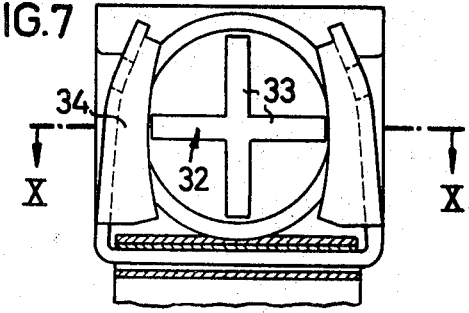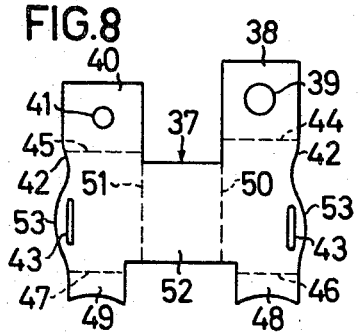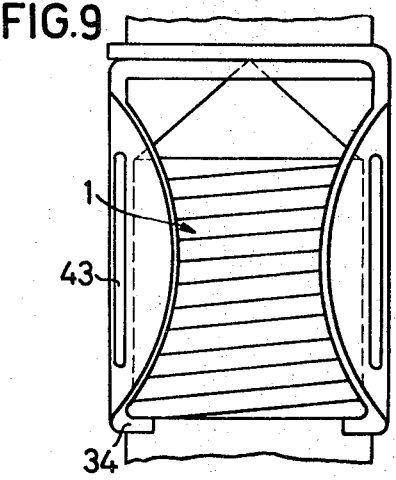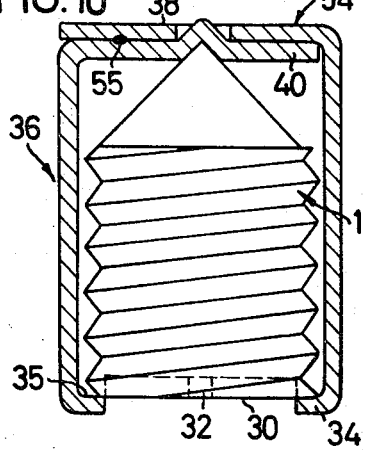

United States Patent Office 3,540,092
Patented Nov. 17, 1970

3,540,092
HOSE CLAMP WITH TIGHTENING WORM
Wolfgang Henning, Dutlingstal,
3538 Niedermarsberg, Germany
Filed July 22, 1968, Ser. No. 746,679
Claims priority, application Germany, July 29, 1967,
H 63,443; June 6, 1968, 1,750,796
Int. Cl. B65d 63/02
U.S. Cl. 24—274        9 Claims

ABSTRACT OF THE DISCLOSURE

A Jubilee clip or hose clamp with a housing containing a worm with a conventional coarse thread and a conical tip at the front, having limited freedom of movement in all directions within the housing. The housing has a cavity formed in the front end wall and the conical tip of the worm engages the cavity in the housing so that when the worm tightens the clip, only tensile forces are produced in the longitudinal direction of the clip band and a compressive force directed towards the clip is exerted by the worm housing upon the worm.

---

The present invention relates to a Jubilee clip or hose clamp in which the tightening operation is effected by a worm mounted to rotate in a housing and operatively engageable with a thread in the clip.

Jubilee clips of the above-described general type are known. In such Jubilee clips, a special worm is employed which has a tapered surface at both ends of the worm thread, and these surfaces of the worm are mounted in recesses formed in the surrounding housing. When the worm is tightened, it is forced more firmly by the taper surfaces into successive slots provided in the clip and forming the mating thread.

This known kind of Jubilee clip presents the disadvantage of being complicated in design because a special worm has to be used which has a conical surface at both ends of the thread, and also a housing must be specially designed to suit this worm and must include corresponding recesses in the two end walls for co-operation with the tapered surfaces.

A further drawback resides in the fact that substantial friction forces are developed between the tapered surfaces of the worm and the corresponding surfaces of the recesses in the worm housing which during tightening can easily cause seizing or jamming especially when the clip has to be pulled up very tight in order to achieve a good seal. Accordingly, a secure seal is not always guaranteed because the tensile forces exerted by the worn on the clip may prematurely relax due to the seizing of the worm.

German specification 1,150,848 has put forward a proposal for overcoming this drawback, namely by providing the worm with a special thread having an asymmetrical thread profile so that the flank of the thread comes into contact with the associated slots in the clip when the clip is tightened. The slots are disposed perpendicular to the worm axis and are throughgoing as well. This approach further complicates the clip design, and has the additional drawback that the thickness of the clip band has to be made relatively large in order that it shall not distort or rupture under load because of the throughgoing slots in the clip.

It is the object of the present invention to provide a Jubilee clip in which, at the expense of relatively little manufacturing outlay, it is possible to employ a relatively thin clip which adapts well to the profile of the part around which it is to fit and can nevertheless withstand considerable tensile forces exerted upon it by the worm without the worm prematurely seizing or jamming and without, when the clip is tightened, the thread of the clip being damaged or broken when subjected by such high forces.

The invention resides in a Jubilee clip or hose clamp which is tightened by means of a worm-engaging thread formed in the clip and mounted to rotate inside a housing, wherein the worm, with a conventional coarse thread and a conical tip at the front, is so located inside the worm housing with limited freedom of movement in all directions, that the extreme end of the conical tip engages a cavity formed in the front end wall of the inside of the housing and so that when the worm tightens the clip only tensile forces are produced in the longitudinal direction of the clip band and a compressive force directed towards the clip is exerted by the worm housing upon the worm.

The invention further includes a Jubilee clip of the type having a worm and worm housing for tightening a threaded clip band comprising an ordinary coarse-threaded worm having a conical tip at one end, and a housing having a cavity in one end for receiving the conical tip, the worm being arranged in the worm housing so that only the extreme end of the conical tip is in contact therewith the remainder of the housing spaced from the worm when in engagement with the clip.

The invention further provides a Jubilee clip of the type having a worm and a worm housing for tightening a threaded clip band comprising an ordinary coarse-threaded worm having a conical tip at one end, and a housing having a recess in one end for receiving the conical tip, the other end of the housing comprising walls forming an abutment means which engages the end face at the opposite end of the worm.

The worm housing for a Jubilee clip may be made by punching out a substantially H-shaped blank with a hole in an upper arm, from a sheet of metal, stamping out a conical-cavitied bulge in the other upper arm, folding the four arms upwards, and then folding the pairs of arms on each side of the H-shaped blank upward, so that the upper arms form a front end wall and the lower arms form a rear end wall, and portions between the upper and lower arms form side walls.

The present invention has the advantage that a commercially available worm with a normal coarse-pitch thread and normal conical tip may be used, and also the housing required for the mounting of the worm can be a relatively simple design, without any risk of seizing, or jamming though high tensile forces are exerted upon the clip.

It has been found that a simple coarse-threaded forward-tapered worm is quite sufficient to mechanically locate the worm exclusively at the extreme end of the conical tip within the housing while giving the remaining parts of the worm degrees of freedom within the housing. Adequate uniform pressure of contact between the individual worm threads and the threads in the clip nevertheless obtained. This phenomena arises from the fact that the force exerted upon the worm by the conical cavity coupled with the tensile reaction force in the top of the clip band, created a torque which is exerted upon the worm which tends to force the worm thread into engagement with the threads in the clip. It is particularly advantageous for the worm to engage the conical cavity exclusively at the tip of the conical part; in this way, the friction forces developed between tip of the cone and conical recess are reduced to a minimum and the forces tending to seize or jam the worm are relatively low even when the tensile forces exerted by the worm upon the clip during tightening are relatively large.

Since the zone of engagement of the tip of the cone, is restricted to the immediate neighborhood of the apex, it is possible to make the conical cavity correspondingly small.

This in turn is advantageous in that the worm housing can have the same wall thickness throughout which is a considerable aid from the manufacturing point of view. Accordingly, the threads of the worm are forced into contact with those of the clip; the contact pressure is thereby uniformly distributed over the full length of the worm and in particular over the rear part of the worm. Thus, seizing or jamming of the worm is avoided even when the clip is drawn up very tightly.

Embodiments according to the invention will now be described with reference to the accompanying drawings, wherein:

FIG. 1 is a partial section through a Jubilee clip and a worm with a housing, the section being taken on the line I—I of FIG. 2;

FIG. 2 is a partial top plan view of the worm shown in FIG. 1;

FIG. 3 is a rear elevation of the Jubilee clip shown in FIG. 2;

FIG. 4 is a partial section through the worm of FIG. 1 with an alternative end wall;

FIG. 5 is a similar section to that of FIG. 4 with a further alternative end wall;

FIG. 6 is a rear elevation of an alternative embodiment of the Jubilee clip, with a single-slotted housing;

FIG. 7 is a similar rear elevation to FIG. 6 with a crossed slot;

FIG. 8 is a developed form of the blank used to manufacture the housing;

FIG. 9 is a top plan view of the Jubilee clip embodiment shown in FIG. 7;

FIG. 10 is a horizontal section through the Jubilee clip taken on the line X—X of FIG. 7;

FIG. 11 is a partial horizontal section through another embodiment;

FIG. 12 is a horizontal section similar to that of FIG. 11 showing a further alternative embodiment; and FIG. 13 is a horizontal section similar to that of FIG. 11, showing another further alternative embodiment.

In the embodiment of FIGS. 1 to 3, the worm 1 is mounted in the worm housing 4 the forward zone of the conical tip 3 is engaged in a conical cavity 6 formed in the front end wall 5 of the worm housing 4, while the rearward cylindrical portion 10 of the worm is partially surrounded at the top region by two mutually opposed walls (lugs or brackets) 8 of the housing at the rear end of the latter.

In order to keep the friction forces between the tips 11 of the thread and the internal faces 12 of the side walls 7 of the housing as low as possible there is a clearance or gap 13. Similarly a clearance or gap 14 is provided between the internal surface of the walls 8 of the housing and the external surface 15 of the cylindrical portion 10 of the worm. In order to prevent the worm from falling out of the housing at the time of assembly, the rearward parts of the two side walls as well as the walls 8 of the housing are bent slightly inwardly (FIG. 3). When a tool is inserted into the slot 2 to tighten the Jubilee clip, a compressive force 16 is exerted by the end wall 5 of the housing upon the conical tip 3. At the same time, a tensile force 19 is developed between the worm thread and the threads 17 in the clip. This tensile force 19, together with the horizontal component 20 of the compressive force 16 develops a couple s acting in the direction of the arrow 21 and ensuring that all the turns of the thread are uniformly forced into contact with the threads 17 in the clip. The vertical component 22 of the compressive force 16 tending to bring about this result.

Because, as FIG. 1 clearly illustrates, only a relatively small fraction 23 of the overall length of the generetrix line 24 of the cone is in engagement with the corresponding conical surface of the cavity, the effective lever arm 25 of the rubbing surface is likewise relatively small so that the locking friction torque exerted in the neighborhood of the conical tip, is relatively small.

As shown in FIG. 1 the external surface of the end wall 5 opposite the conical cavity 6 contains a bulge which presents no problem from the manufacturing point of view. A lubricant, in particular a grease, can be introduced into the conical cavity which has the advantage that when the worm tightens the clip, the friction forces and therefore the locking forces are further reduced.

The invention has the advantage that commercially available worms can be used. Thus, there is no requirement for the manufacture of special worms or special screws so that for this reason alone the Jubilee clip in accordance with the present invention is much cheaper to manufacture than the known type of special threaded worm with two tapered surfaces.

In order to tighten the clip by rotating the worm, the latter can be equipped with, for example, a single slot, a crossed slot, a sunk or recessed hexagon, a sunk square or even internal toothing. Accordingly, the corresponding commercially available tools can be employed all in accordance with the requirements of assembly, however, special tools may be used in situations where the location of the clips is such that one has poor access to it. The versatility of the design of the means by which the clip is tightened up has the advantage that for the remainder the clip requires no modification whatsoever as far as the drive arrangements are concerned.

It may be expedient to use a multi-start worm or screw instead of single-start type, the advantage of the multi-start type is that each individual thread start has a larger pitch than in the case of a single-start worm. This larger pitch permits correspondingly faster assembly, yet not at the expense of the number of turns of thread is concerned. In the case of a multi-start worm too, the number of points of engagement between the thread turns and the threads in the clip is exactly the same as a single-start worm so that the same loading factor and therefore the same uniformity of loading of the individual threads is achieved.

In accordance with the alternative embodiment shown in FIG. 4, the end wall 5 of the housing 4 contains a conical recess 6 which passes through end external surface. In this way a simplification of the manufacture of the housing can be achieved insofar as there is no need to create a buldge on the external surface 27 of the end wall 5; instead, the cavity forms a hole 28 at the external surface 27 of the end wall 5.

The blind cavity design of FIGS. 1 and 2, however, is advantageous in that any lubricant introduced into the cavity remains there longer than in the FIG. 4 embodiment where it can pass out of the hole 28.

In the embodiment of FIG. 5 a through cavity is provided similar to that in FIG. 4 but it is shaped as a cylindrical hole 29 in contrast to the conical form shown in FIG. 4.

The walls 8 of the housing are designed to prevent the worm 1 from falling out of the housing 4 as well as to act as abutments when the clip is released by unscrewing the worm 1. In this context, in particular where the clip is not released until it has been in service for some considerable time, considerable compressive forces may develop due to the fact that the clip adheres to the substrate, which is generally rubber or a synthetic rubber, in the region of the overlap and elsewhere. These compressive forces develop between the last turn of thread on the worm and the internal edges of the walls 8 and can achieve relatively high values because of the relatively small annular areas available for contact, thus giving rise to a high surface pressure and possible damage to the thread or even forcing open of the walls of the housing.

To prevent this from happening, in accordance with the embodiment of FIGS. 6 to 13, the cylinder 10 of the worm 1 has been omitted and a slot 31 in FIG. 6 or a crossed slot 32 in FIG. 7 has been provided in the back face of the worm. The slot sections 31 and 33 are not full-length. In this way, it is made possible to give the two walls 34 of the housing a larger abutment area 35, which in this embodiment co-operates with the back face 30 of the worm 1 instead of with the last turn of the worm thread; accordingly larger forces can be withstood by the worm without affecting its thread. Also, there is no danger that the walls 34 of the housing will be forced apart, because their particular abutment surfaces 35 bear not against an inclined surface on the last turn of the thread, but against the back face of the worm and perpendicular to the direction of the compressive force component.

A further manufacturing advantage of this design resides in the fact that the worm does not have to have a cylindrical portion 10 which is produced in a separate operation. Also, the manufacture of a less than full length slot presents no more of a problem than the manufacture of a full-length slot.

The incomplete slot has the further advantage that the walls 34 of the housing can be turned into a greater extent than is possible in the first embodiment, without any risk that the screwdriver will interfere with one of the walls 34, i.e. there is no change when tightening up or releasing the worm because the screwdriver is accurately located radially.

Finally, by omitting the cylindrival portion of the worm, a shorter overall length both of the worm and the worm housing this is particularly significant where small-diameter Jubilee clips are employed.

The deep-drawing process is used in the manufacture of the worm housing in the embodiments of FIGS. 1 to 5. According to another embodiment the manufacture of the housing begins with an H-shaped blank 37 which is punched out of a sheet material of appropriate thickness. A hole 39 is at the same time punched in the upper arm 38. A conical-cavitied bulge 41 is then stamped in the upper arm 40. In the central zone adjacent the two edges 42 elongated slots 43 are punched out. Then, along four seam lines 44, 45, 46, 47 (shown in broken line in FIG. 8) the two upper arms 38 and 40 and the two lower arms 48, 49 are bent upwards substantially through 90° and facing the surface in which the conical cavities of the bulge is formed. Then, the two pairs of arms 38, 40 and 48, 49 are bent towards one another along the seam lines 50, 51 substantially through 90°, so that the two upper arms 38, 40 overlap one another until the bulge 41 is in line with the hole 39 as shown in FIG. 10. Finally, a combination tool is used to press the two upper arms 38, 40 firmly into contact with one another so that the bulge 41 protrudes through the hole 39.

The tip of the worm 1 is then inserted into the conical cavity of the bulge 41 until it rests upon the base 52 and its back face 30 is seated against the abutment face 35 of the two bottom arms 48, 49. The two bottom arms 48, 49 form the two rear walls 34 of the housing.

Finally, the two portions 53 adjacent the elongated slots 43, are bent obliquely inwards towards one another, as shown in FIG. 7, to prevent the worm from falling out of the housing. However, the worm is free to move and has clearance in all directions within the housing as discussed above with respect to the embodiment of FIGS. 1–5.

This method of manufacturing the housing is not only simpler than the deep drawing method from the production point of view, but has the further advantage with respect to small worms and housings that makes it more reliable than deep-drawing. Further, the end wall 54 is of double thickness to give the housing increased strength at the point where it is required.

In order to fix the arm 38 relative to the arm 40, they are welded together at points 55 along their mutually opposed contacting faces.

In accordance with another embodiment as shown in FIG. 11, the dimensions of the hole 39 of the bulge 41 are so related to one another that when the upper arms 38, 40 overlap one another, a clearance 56 is left between the mutually opposed faces of the two upper arms 38, 40, creating an annular contact edge 57 between the hole 39 and the bulge 41. This space forms a resistive zone during a resistance welding operation as an annular weld seam is formed between overlapping arms at their contact edge 57.

This embodiment is similar to that used with contact welding. It however, avoids the necessity for pressing in special contact studs. Further, it has an advantage over spot-welding in that the welding tools, in particular the electrodes, are not prematurely worn since in this kind of resistance welding electrodes of substantial area can be employed.

In the embodiment of FIG. 12, an additional bond between the two upper arms 38, 40 is produced by riveting. A portion of the upper arm 40 forms a deep-drawn hollow rivet 58 which passes through the hole 39 in the externally situated upper arm 38. After the hollow rivet is then swaged to form a collar 59. At the same time frustoconical enlargement 60 is produced at the bottom end of the hollow rivet bore 61 so that the conical tip 3 of the worm can be received therein.

In the embodiment of FIG. 13, separate hollow rivets 63 are inserted through the holes, 39, 62 in the upper arms 38 and 40, and riveted over externally to form a collar 59. The hollow rivet 63 is expanded by exerting a force from its lower interior to form a conical cavity 64, the hole 62 is conically shaped. In this way, not only is the hollow rivet securely seated in the hole 62 but at the same time the frustoconical portion 60 for receiving the conical tip 3 is produced.

This method of attachment has the advantage over the one described earlier, that the hollow rivet can be made of a more wear-resistant material than the rest of the worm housing, and this is particularly significant because it is precisely at the frustoconical portion 60 that the surface pressure, and therefore the frictional forces are generated by the conical tip 3 of the worm. In this way the service life of the device can be increased and at the same time the friction can be reduced.

I claim:
1. A hose clamp comprising a casing, a band adapted to pass around a hose to be clamped and receivable in said casing, a worm rotatable in said casing and having a thread engageable with said band to tighten said clamp upon rotation of said worm while exerting traction of said worm in one axial direction, said casing having an end wall ahead of said worm in said direction provided with a camming recess offset from the axis of said worm toward said band, said worm being formed at the end thereof proximal to said wall with a conical point receivable in said recess upon tightening of said worm whereby the other end of said worm is urged against said band, said casing enclosing said worm with all-around clearance but for the engagement of said point with said wall.

2. The clamp defined in claim 1 wherein said recess and said point are dimensioned such that said point engages the wall of said recess over a minor fraction of the surface area of said point.

3. The clamp defined in claim 2 wherein said casing is provided in the region of said other end with a pair of lugs over said other end of said worm with clearance.

4. The clamp defined in claim 3 wherein said casing further comprises a pair of lateral walls flanking the threaded portion of said worm with clearance.

5. The clamp defined in claim 1 wherein said recess is formed as an outwardly bulging deformation of said wall.

6. The clamp defined in claim 1, further comprising a tool-engaging formation provided in the other end of said worm for rotating same.

7. The clamp defined in claim 1 wherein said worm is provided with plural-start threads.

8. The clamp defined in claim 1 wherein said recess is a throughgoing opening formed in said wall.

9. The clamp defined in claim 8 wherein said opening is of cylindrical configuration.

References Cited

UNITED STATES PATENTS

| | | | |
|---|---|---|---|
| 2,362,901 | 11/1944 | Jamie | 24—274 |
| 2,828,524 | 4/1958 | Cheney | 24—274 |
| 3,087,220 | 4/1963 | Tinsley | 24—274 |
| 3,311,959 | 4/1967 | Schaub | 24—274 |

FOREIGN PATENTS 1,008,465 2/1952 France.

PETER M. CAUN, Primary Examiner